United States Patent
Gelling

(10) Patent No.: US 9,563,410 B2
(45) Date of Patent: Feb. 7, 2017

(54) DATA-DRIVEN MENUING SYSTEM FOR PROVIDING A FLEXIBLE USER INTERFACE ON AN ELECTRONIC DEVICE

(75) Inventor: Richard R Gelling, Rowlett, TX (US)

(73) Assignee: AMX LLC, Richardson, TX (US)

( * ) Notice: Subject to any disclaimer, the term of this patent is extended or adjusted under 35 U.S.C. 154(b) by 238 days.

(21) Appl. No.: 13/481,538

(22) Filed: May 25, 2012

(65) Prior Publication Data
US 2012/0304120 A1 Nov. 29, 2012

Related U.S. Application Data

(60) Provisional application No. 61/489,808, filed on May 25, 2011.

(51) Int. Cl.
- *G06F 9/445* (2006.01)
- *G06F 9/44* (2006.01)
- *G06F 9/45* (2006.01)
- *H04N 21/81* (2011.01)

(52) U.S. Cl.
CPC . *G06F 8/38* (2013.01); *G06F 8/65* (2013.01); *G06F 8/41* (2013.01); *H04N 21/8173* (2013.01)

(58) Field of Classification Search
None
See application file for complete search history.

(56) References Cited

U.S. PATENT DOCUMENTS

| | | | | |
|---|---|---|---|---|
| 5,301,270 | A * | 4/1994 | Steinberg | G06F 8/20 715/866 |
| 5,974,256 | A * | 10/1999 | Matthews | G06F 8/41 717/118 |
| 6,205,526 | B1 * | 3/2001 | Tanuma | 711/162 |
| 7,574,699 | B1 * | 8/2009 | Simmons | G06F 8/4434 717/136 |
| 7,694,291 | B2 * | 4/2010 | Chen et al. | 717/162 |
| 7,966,345 | B1 * | 6/2011 | Funston | G06F 17/5027 707/792 |
| 2004/0210896 | A1 * | 10/2004 | Chou et al. | 717/174 |
| 2005/0100313 | A1 * | 5/2005 | Wang | 386/46 |
| 2005/0144612 | A1 * | 6/2005 | Wang | G06F 8/65 717/168 |
| 2008/0184072 | A1 * | 7/2008 | Odlivak et al. | 714/32 |
| 2008/0209193 | A1 * | 8/2008 | Zhang et al. | 713/1 |
| 2009/0070754 | A1 * | 3/2009 | Ichikawa | 717/168 |
| 2010/0063818 | A1 * | 3/2010 | Mason | G06F 3/0482 704/251 |
| 2010/0262816 | A1 * | 10/2010 | Klings et al. | 713/1 |
| 2010/0318961 | A1 * | 12/2010 | Khoruzhenko et al. | 717/107 |
| 2011/0029921 | A1 * | 2/2011 | Terada et al. | 715/810 |
| 2011/0072423 | A1 * | 3/2011 | Fukata | 717/172 |
| 2011/0173604 | A1 * | 7/2011 | Nakamura et al. | 717/173 |
| 2011/0222549 | A1 * | 9/2011 | Connelly et al. | 717/173 |
| 2011/0258618 | A1 * | 10/2011 | Capuozzo et al. | 717/168 |
| 2012/0036373 | A1 * | 2/2012 | Kofman et al. | 713/193 |

* cited by examiner

Primary Examiner — Isaac T Tecklu

(57) ABSTRACT

An architecture for altering the content of a menuing system with little or no change to existing firmware of an electronic device is disclosed. A menu text file is generated and the menu text file is compiled into source code. Menu firmware is compiled and liked using the source code into a downloadable binary for the electronic device. The downloadable binary does not alter existing firmware of the electronic device.

17 Claims, 3 Drawing Sheets

DATA-DRIVEN MENUING SYSTEM FOR PROVIDING A FLEXIBLE USER INTERFACE ON AN ELECTRONIC DEVICE

CROSS REFERENCE TO RELATED APPLICATIONS

The present application is a non-provisional of, and claims priority to, U.S. Provisional Patent Application Ser. No. 61/489,808, filed May 25, 2011, the subject matter of which is hereby incorporated by reference in its entirety.

FIELD

The present invention generally pertains to menuing systems, and more specifically, to menuing system architectures that can be modified with little or no change to the existing firmware of an electronic device.

BACKGROUND

Electronic devices such as signal management systems, media management systems, Digital Video Disk ("DVD") players, televisions, etc. generally have firmware that controls their operation. Conventional menuing systems of such devices require existing firmware source code changes when a new menu item needs to be added, a menu requires a change, and the like. Changing firmware source code increases development time for Graphical User Interfaces ("GUIs") by programmers. Further, non-software developers generally cannot make complex firmware source code changes. Accordingly, a menuing system that reduces or eliminates the necessity of existing firmware source code changes may be beneficial.

SUMMARY

Certain embodiments of the present invention may provide solutions to the problems and needs in the art that have not yet been fully solved by conventional menuing systems. For example, certain embodiments of the present invention allow a user to change a menu of an electronic device with little or no change to the existing firmware of the device.

In one embodiment of the present invention, a computer program embodied on a computer-readable storage medium is configured to cause a processor to generate a menu text file and compile the menu text file into source code. The computer program is also configured to cause the processor to compile and link menu firmware using the source code into a downloadable binary for an electronic device. The downloadable binary does not alter existing firmware of the electronic device.

In another embodiment of the present invention, a computer-implemented method includes generating, by a processor, a menu text file and compiling, by the processor, the menu text file into source code. The computer-implemented method also includes compiling and linking, by the processor, menu firmware using the source code into a downloadable binary for an electronic device. The downloadable binary does not alter existing firmware of the electronic device.

In yet another embodiment of the present invention, an apparatus includes physical memory including computer program instructions and a processor configured to execute the computer program instructions. The processor is configured to generate a menu text file and compile the menu text file into source code. The processor is also configured to compile and link menu firmware using the source code into a downloadable binary for an electronic device. The downloadable binary does not alter existing firmware of the electronic device.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention facilitate change of a menu of an electronic device with little or no change to the existing firmware of the device. The menu data and rules may be abstracted from the menu engine. Embodiments may be completely data-driven by element definitions of sets, variables, and menus/pages. Instructions for how the device is to display and drive the menu may be built into the data. A menu text file may be generated, the menu text file may be compiled into source code, and menu firmware may be compiled and linked into a downloadable binary that can be loaded onto an electronic device via a serial port, a wireless network card, an Ethernet port, or any other suitable means.

Figure 1:
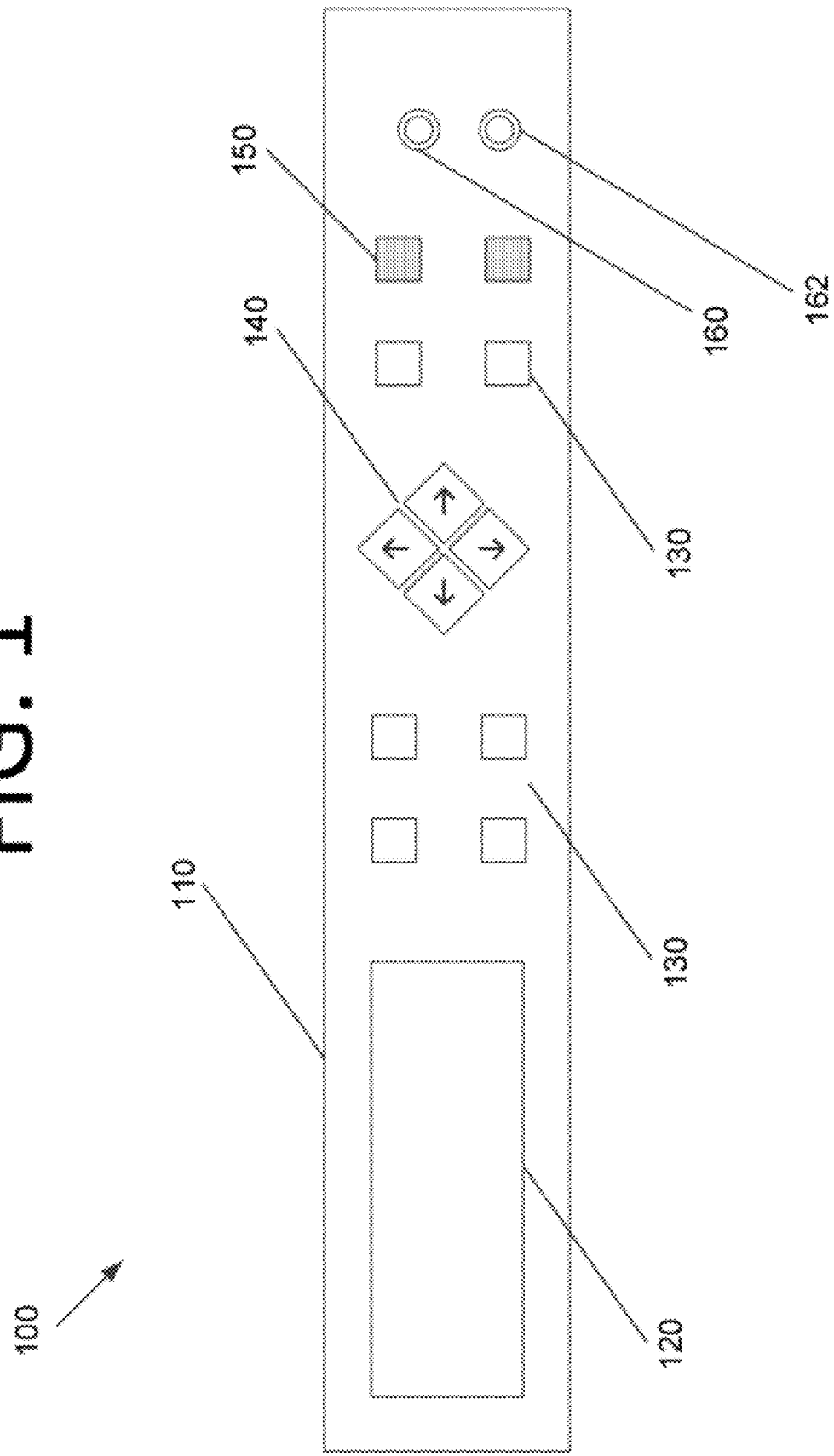
FIG. 1 illustrates a front view of a front panel of an electronic device.

FIG. 1 illustrates a front view of a front panel 110 of an electronic device 100. Front panel 110 is the user interface portion of electronic device 100. Front panel 110 includes a visual display 120, such as a Liquid Crystal Display (LCD), to provide a visual display for a user. Front panel 110 also includes various control buttons 130 that control certain features of electronic device 100. Control buttons 130 may be for features such as switching a menu, take/cycle, accessing a video menu, accessing an audio menu, accessing a status menu, and exiting a menu.

Front panel 110 further includes directional buttons 140 that control navigation on display 120, such as menu navigation. Directional buttons 140 allow the user to navigate up/down (menu scrolling) and left/right (changing menu values). Additionally, front panel 110 includes LEDs 150 indicating various status conditions of electronic device 100, such as audio mute and video mute for certain devices. Display 120 is used for displaying the menus and gives the user the ability to scroll through the menu pages and changing values on menu pages using directional buttons 140.

Front panel 110 includes two serial ports: command and control serial port 160 and debug serial port 162. Command and control serial port 160 is for command and control communications with the main board using Card Control Protocol ("CCP"). Debug serial port 162 is for the Command Line Interface ("CLI"). Both serial ports 160, 162 may operate with a serial port configuration of 115200,N,8,1. A special debug cable may be required for debug serial port 162. Such a cable may convert from a 4-pin header to a standard DB9 connector.

Front panel 110 does not make many decisions in and of itself. Rather, front panel 110 is the user interface extension of a main board processor (not shown) and passes all information back to the processor for decision making and processing. In other embodiments, a single processor system can be used where the menu system is abstracted from the application (where the menuing is not separated to another processor). Some elements of the menu are processed by front panel 110 where specific knowledge of menu location, formatting, etc. is only known by front panel 110.

Menu Nomenclature

The following naming convention is used for menuing systems described herein.

Variable: a value that can be embedded in a line of text. A variable can be read-only (i.e., not modifiable) or read-write (i.e., modifiable with left/right buttons or any other suitable button or user control mechanism, such as a haptic interface that may be part of, or separate from, a visual display). Menu pages man contain multiple variables, but menu pages may be limited to only one read-write variable.

Line: one line of text on a visual display, such as a 2-line LCD display. A line can be 0-20 characters in length in some embodiments, but the length and number of lines can vary as a matter of design choice. A line can consist of text, variables, or a combination of the two.

Page: one full screen on the visual display, or a collection of lines. In other words, two lines make up a page in some embodiments. In some embodiments, all pages on the visual display consist of two lines. This may not be a limitation of the firmware, but rather, a limitation on the way the system of such embodiments was asked to behave. Consequently, such embodiments may have no pages that scroll down to reveal more lines.

Menu: a logical grouping or collection of pages. A menu can include only one page (e.g., volume) or a series of pages (e.g., video output). Menus may flow or traverse from one page to the next forward, or to the previous one backwards. Menus may also wrap between the first and last pages. However, in some embodiments, the menu may provide access to non-sequential pages or utilize an alternative ordering.

Menu System from Text-Based File

The collection of menus for the visual display may be based on an American Standard Code for Information Interchange ("ASCII") text file for simplicity. However, any suitable single language or multi-language format, such as Unicode, may be used in some embodiments. In this manner, simple changes to menu text or behavior can be performed without altering firmware source code. In the menuing system of some embodiments, a menu text file (e.g., "menu.dat") may define the sets, variables, menus, pages, and lines of the visual display. In effect, this file may define the features, capabilities, and behavior of the menus. The text file may have three sections—sets, variables, and menus, as defined below.

Set: a collection of values to which a variable can be set. For example, "Off" and "On" might define the values in a set in certain cases, but any suitable values may be used. Each set is generally specified with a unique identifier ("ID").

Variable: an entity that holds a value and is embedded in a line of text on a menu page. Variables can be one of two types in some embodiments: numeric and set. Variables can also wrap in some embodiments, meaning that when the maximum value is exceeded, the variables will go the first value, and when the minimum value is exceeded, the variables go to the last value. This is defined individually for each variable. A numeric variable may be defined as a number with a high/low range and an increment/decrement value. When the value is altered using, for example, the left button, the decrement may be applied to the value. When the value is altered using, for example, the right button, the increment may be applied to the value. However, any other suitable control mechanism may be used as a matter of design choice. A set variable is a variable whose values are defined by a set.

Variables can be placed within text and the current value of that variable may then be substituted at runtime to yield a string to display to the user (e.g., "Volume:26"). Logic can be applied such that multiple strings can be defined for a line of text, but only the first one whose logic definition is true is displayed in some embodiments. Logic is an equivalence test of a variable and a value. If the variable is equal to the given value, then the string may be chosen for display. A default logic may also be defined that will always equate to true so a string can always be chosen, if desired, in some embodiments.

Menu: a collection of lines and pages that define the text and alignment of the text on pages of the menu.

The file may be structured such that sets are defined first, followed by variables, followed by menus. A "//", or any other suitable indicator, may be used to indicate comments within the file. These lines are not processed.

Set Definitions

Set definitions generally should start with a suitable indicator, such as "[set]", that indicates the beginning of a set definition in the text file. Set definitions may require keywords such as "sId", which is a unique identifier of the set, and "stext", which is the text of a set value, or element. The set values may be indented from [set] in the text file to ease human readability. In some embodiments, sId has a numeric value, such as from 1-100, which is typically unique for each set definition. To conserve space in memory, such as flash memory, sIds may be sequential with no gaps. stext may be a string with one entry for each element in the set. The number of elements in the set may be determined by the number of stext entries. Table 1 includes some examples of set definitions.

TABLE 1

EXAMPLE SET DEFINITIONS

| [SET] | [SET] | [SET] |
|---|---|---|
| sId = 1 | sId = 46 | sId = 6 |
| stext = High | stext = All | stext = Off |
| stext = Medium | stext = 1 | stext = On |
| stext = Low | stext = 2 | |
| | stext = 3 | |
| | stext = 4 | |

Variable Definitions

Variable definitions may generally start with a suitable indicator, such as "[var]", and the keywords needed for the definition are generally dependent on the variable type. The variable values may be indented from [var] in the text file. In some embodiments, the following keywords and values are used to define a variable. However, any suitable indicator, keywords, and values may be used.

[var]: variable definitions begin with this header.

vId: a numeric value, such as 1-255. vId should be unique for each [var] that is defined and, to conserve memory, olds may be sequential with no gaps.

vtype: N designates a numeric value, S designates a selection of values from a set, and Z designates a string of characters.

vwrap: 0 designates that values are not wrapped and 1 designates that values are wrapped from the first variable to the last variable, and vice versa.

vramp: 0 designates not to ramp (i.e., single button presses are required for modifying a value) and 1 designates to ramp (i.e., scroll) through the set of values at a predetermined speed when the button is held.

If vtype is N (numeric):

vlow: indicates the smallest value to allow.

vhigh: indicates the largest value to allow.

vinc: indicates the amount to increment the value.

vdec: indicates the amount to decrement the value.

vinit: the initial value of the variable (should fall in the range defined by vlow through vhigh).

If vtype is S (set selection):

vset: the ID of the set (sId) to use for selection values.

vinit: the initial value of the variable (should match one of the stext values defined in the set).

Table 2 includes some examples of variable definitions.

TABLE 2

EXAMPLE VARIABLE DEFINITIONS

| [VAR] | [VAR] | [VAR] |
|---|---|---|
| vId = 1 | vId = 2 | vId = 15 |
| vtype = N | vtype = S | vtype = N |
| vwrap = 0 | vwrap = 1 | vwrap = 0 |
| vramp = 1 | vramp = 0 | vramp = 0 |
| vlow = 0 | vset = 46 | vlow = 0.5 |
| vhigh = 100 | vinit = all | vhigh = 3.5 |
| vinc = 1 | | vinc = 0.1 |
| vdec = 1 | | vdec = 0.1 |
| vinit = 20 | | vinit = 2.2 |

Menu Definitions

Menu definitions may generally start with an indicator, such as "[menu]", and several keywords may generally be required. For example, the following indicator and keywords may be used in some embodiments. However, any suitable indicator, keywords, and values may be used.

[menu]: menu definitions begin with this header.

mId: a numeric value, such as 1-15. mId should be unique for each [menu] that is defined and, to conserve memory, colds may be sequential with no gaps.

[page]: identifies the start of a page on the menu. In some embodiments, the number of pages in the menu may be limited to a predetermined number, such as 30.

[line]: one entry for each line of text on the page. The number of lines to display may be determined by the number of [line] entries.

align: one per [line]. L=left justify, R=right justify, C=center text.

text: a string to display on the line using the format: var,val,text, where var is a valid variable ID, val is the value of var, and text is the string to display if var equals val. Variables can be embedded into the text using $x$ or #x#, in some embodiments, although any suitable designation mechanism may be used. #x# displays variable x, but its value cannot be modified in some embodiments. $x$ displays variable x and allows modification of x using the left/right buttons on the visual display in some embodiments. Only one modifiable variable is allowed on a page in some embodiments.

Multiple text items may be given for each line. The first item may be where var=val will be displayed. var=0 and val=0 may be the default and may always equate to true. Some example menu definitions are included below.

Example 1

```
[menu]
    mId=1
    [page]
        [line]
            align=C
            text=0,0,Main Amp Output
        [line]
            align=C
            text=0,0,VOLUME: $1$
```

Example 2

```
[menu]
    mId=6
    [page]
        [line]
            align=C
            text=0,0,#22#: #85#
        [line]
            align=C
            text=2,ALL,PHASE: $38$
            text=2,1,PHASE: $39$
            text=2,2,PHASE: $40$
            text:0,0,PHASE: NA
    [page]
        [line]
            align=C
            text=0,0,Status
        [line]
            align=C
            atext=0,0,#46#
```

Using a Menu Text File to Generate Menu Code

Figure 2:
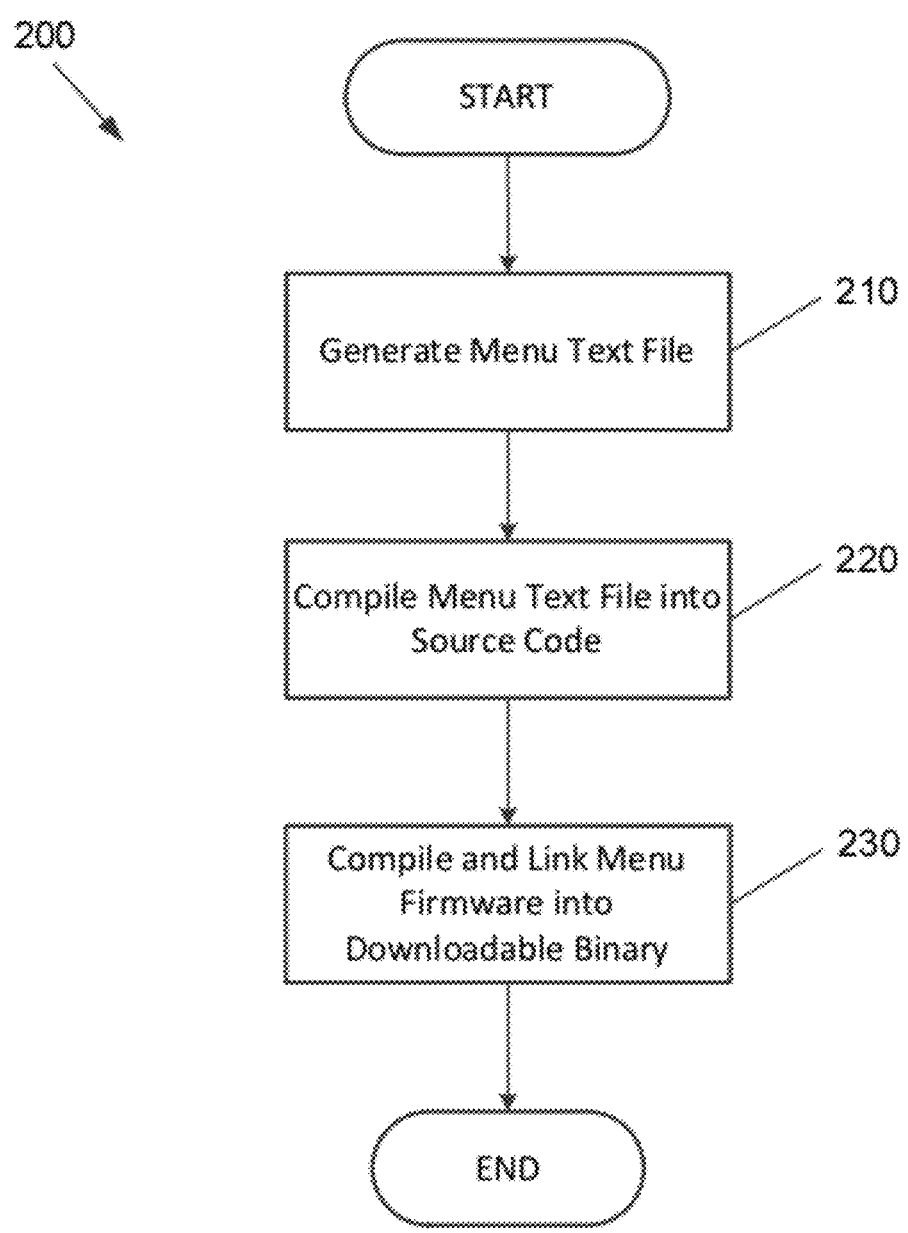
FIG. 2 is a flowchart illustrating a method for compiling a menu text file, according to an embodiment of the present invention.

A control panel, such as a front panel, generally does not use the menu text file directly. Rather, the text file generally should be compiled in such a manner as to format the data into the most efficient form to fit into memory and be accessible by the control panel firmware. FIG. 2 is a flowchart 200 illustrating a method for compiling a menu text file, according to an embodiment of the present invention. In some embodiments, the method of FIG. 2 may be implemented, for example, by system 300 of FIG. 3.

A menu text file is generated at 210. The menu text file may be named "menu.dat" in some embodiments, but any valid name could be used. In some embodiments, the menu text file may be created using a text editor, a spreadsheet that is converted to text, or by any suitable software application.

Next, the menu text file is compiled into source code, such as C code, C++ code, Java code, etc. at 220. A program converts the menu text file into source code that can be compiled with the electronic device firmware and loaded onto a processor. At step 220, the parsing program may further compress the menu file data for runtime execution. This program may be named "menuparser.exe", for example, and may be run from the command line. The program may take several parameters. Supplying no parameters, or an incorrect parameter, may yield help text indicating the proper usage. Table 3 lists some example menuparser.exe parameters, according to an embodiment of the present invention.

TABLE 3

EXAMPLE MENUPARSER.EXE PARAMETERS

| | |
|---|---|
| -m | This optional parameter may output all of the parsed information from the text file in a readable format. |
| -s | This optional parameter may show the menu statistics after the text file that has been parsed. |
| -v | This optional parameter may enable verbose mode. |
| <menu file> | This potentially mandatory parameter may be the name of the menu text file to be parsed. |
| <output file> | This potentially mandatory parameter may be the name of the source file(s) that will be created. Two files are created for C: a .c file and a .h file. |

An example command line is: menuparser -s menu.dat menuData. This command may yield two files: menuData.c and menuData.h. The menu firmware is then compiled and linked into a downloadable binary at 230 using a suitable compiler for the desired programming language. The downloadable binary is then loaded into memory and run by the processor of the electronic device. When compressed, Random Access Memory ("RAM") may be freed up, allowing the implementation of such a menuing architecture on small processors using limited resources (e.g., 32K of flash and 4K of RAM).

Figure 3:
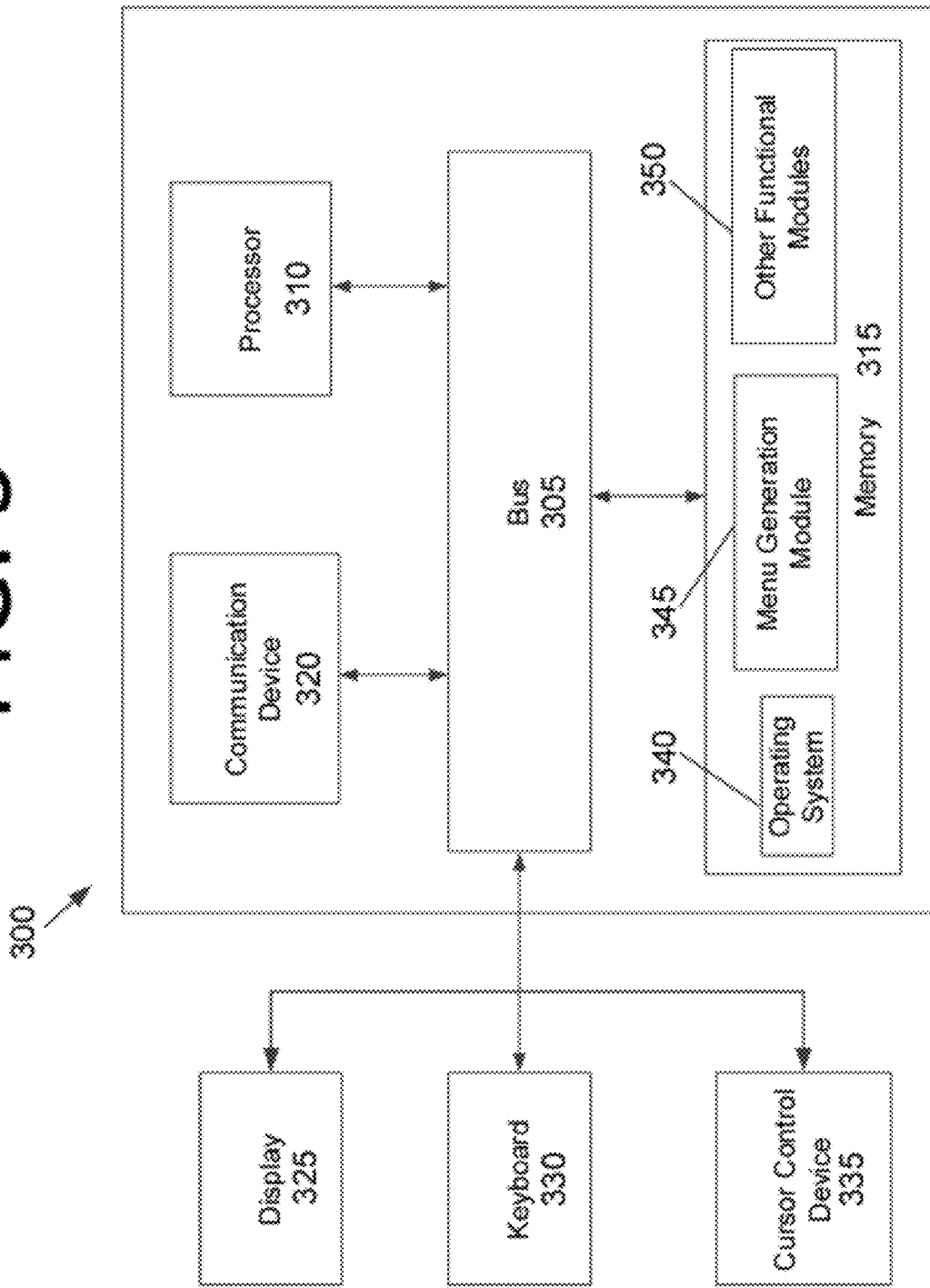
FIG. 3 illustrates a computing system for generating a menu, according to an embodiment of the present invention.

FIG. 3 illustrates a computing system 300 for generating a menu, according to an embodiment of the present invention. System 300 includes a bus 305 or other communication mechanism for communicating information, and a processor 310 coupled to bus 305 for processing information. Processor 310 may be any type of general or specific purpose processor, including a central processing unit (CPU) or application specific integrated circuit (ASIC). System 300 further includes a memory 315 for storing information and instructions to be executed by processor 310. Memory 315 can be comprised of any combination of random access memory (RAM), read only memory (ROM), flash memory, cache, static storage such as a magnetic or optical disk, or any other types of non-transitory computer-readable media or combinations thereof. Additionally, system 300 includes a communication device 320, such as a wireless network interface card, to provide access to a network.

Non-transitory computer-readable media may be any available media that can be accessed by processor 310 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 310 is further coupled via bus 305 to a display 325, such as a Liquid Crystal Display ("LCD"), for displaying information to a user. A keyboard 330 and a cursor control device 335, such as a computer mouse, are further coupled to bus 305 to enable a user to interface with system 300. However, in certain embodiments such as those for mobile computing implementations, a physical keyboard and mouse may not be present, and the user may interact with the device solely through display 325 and/or a touchpad (not shown). Any type and combination of input devices may be used as a matter of design choice.

In one embodiment, memory 315 stores software modules that provide functionality when executed by processor 310. The modules include an operating system 340 for system 300. The modules further include a menu generation module 345 that is configured to generate a firmware binary for displaying and controlling a menu on an electronic device. System 300 may include one or more additional functional modules 350 that include additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIG. 3 may be performed by a computer program, encoding instructions for the non-linear adaptive processor to perform at least the method described in FIG. 3, in accordance with an embodiment of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the method described in FIG. 3, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Some embodiments of the present invention allow customization of a menu of an electronic device with little or no changes to the existing firmware. A menu text file may be generated, the menu text file may be compiled into source code, and menu firmware may be compiled and linked into a downloadable binary that can be loaded onto an electronic device via any other suitable means. Embodiments may be completely data-driven by element definitions of sets, variables, and menus/pages in the text file. Instructions for how the device is to display and drive the menu may be built into the data.

It will be readily understood that the components of various embodiments of the present invention, as generally described and illustrated in the figures herein, may be arranged and designed in a wide variety of different configurations. Thus, the detailed description of the embodiments of the systems, apparatuses and methods of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable storage medium, the program configured to cause a processor to:
   generate a menu text file;
   compile the menu text file into source code;
   compile and link menu firmware using the source code into a downloadable binary for an electronic device;
   load the downloadable binary; and
   change, via the downloadable binary, a menu on the electronic device while maintaining an existing firmware state of the electronic device during the load of the downloadable binary;
   wherein the compiling of the menu text file into the source code further comprises compressing data from the menu text file.

2. The computer program of claim 1, wherein the program is further configured to cause the processor to upload the downloadable binary onto the electronic device.

3. The computer program of claim 1, wherein the menu text file comprises one or more set definitions, one or more variable definitions, and one or more menu definitions.

4. The computer program of claim 3, wherein each of the one or more set definitions comprises an indicator of a start of the set definition, a unique identifier of the set definition, and one or more set values.

5. The computer program of claim 3, wherein each of the one or more variable definitions comprises an indicator of a start of the variable definition and a unique identifier of the variable definition, and at least one keyword and value pair that defines another attribute of the variable definition.

6. The computer program of claim 3, wherein each of the one or more menu definitions comprises an indicator of a start of the menu definition, one or more indicators of a start of a page definition within the menu definition, and one or more indicators of a start of a line definition within a page definition.

7. A computer-implemented method, comprising:
   generating, by a processor, a menu text file;
   compiling, by the processor, the menu text file into source code;
   compiling and linking, by the processor, menu firmware using the source code into a downloadable binary for an electronic device;
   loading the downloadable binary;
   changing, via the downloadable binary, a menu on the electronic device while maintaining an existing firmware state of the electronic device during the loading of the downloadable binary; and
   wherein the compiling of the menu text file into the source code further comprises compressing data, by the processor, from the menu text file.

8. The computer-implemented method of claim 7, wherein the menu text file comprises one or more set definitions, one or more variable definitions, and one or more menu definitions.

9. The computer-implemented method of claim 8, wherein each of the one or more set definitions comprises an indicator of a start of the set definition, a unique identifier of the set definition, and one or more set values.

10. The computer-implemented method of claim 8, wherein each of the one or more variable definitions comprises an indicator of a start of the variable definition and a unique identifier of the variable definition, and at least one keyword and value pair that defines another attribute of the variable definition.

11. The computer-implemented method of claim 8, wherein each of the one or more menu definitions comprises an indicator of a start of the menu definition, one or more indicators of a start of a page definition within the menu definition, and one or more indicators of a start of a line definition within a page definition.

12. An apparatus, comprising:
physical memory comprising computer program instructions; and
a processor configured to execute the computer program instructions, the processor configured to:
generate a menu text file,
compile the menu text file into source code,
compile and link menu firmware using the source code into a downloadable binary for an electronic device;
load the downloadable binary;
change, via the downloadable binary, a menu on the electronic device while maintaining an existing firmware state of the electronic device during the load of the downloadable binary; and
wherein when compiling of the menu text file into the source code, the processor is further configured to compress data from the menu text file.

13. The apparatus of claim 12, wherein the processor is further configured to upload the downloadable binary onto the electronic device.

14. The apparatus of claim 12, wherein the menu text file comprises one or more set definitions, one or more variable definitions, and one or more menu definitions.

15. The apparatus of claim 14, wherein each of the one or more set definitions comprises an indicator of a start of the set definition, a unique identifier of the set definition, and one or more set values.

16. The apparatus of claim 14, wherein each of the one or more variable definitions comprises an indicator of a start of the variable definition and a unique identifier of the variable definition, and at least one keyword and value pair that defines another attribute of the variable definition.

17. The apparatus of claim 14, wherein each of the one or more menu definitions comprises an indicator of a start of the menu definition, one or more indicators of a start of a page definition within the menu definition, and one or more indicators of a start of a line definition within a page definition.

* * * * *